May 26, 1970  O O SHURTLEFF ET AL  3,514,134
CONDUIT FITTING WITH SEAL
Filed Nov. 6, 1968    2 Sheets-Sheet 1
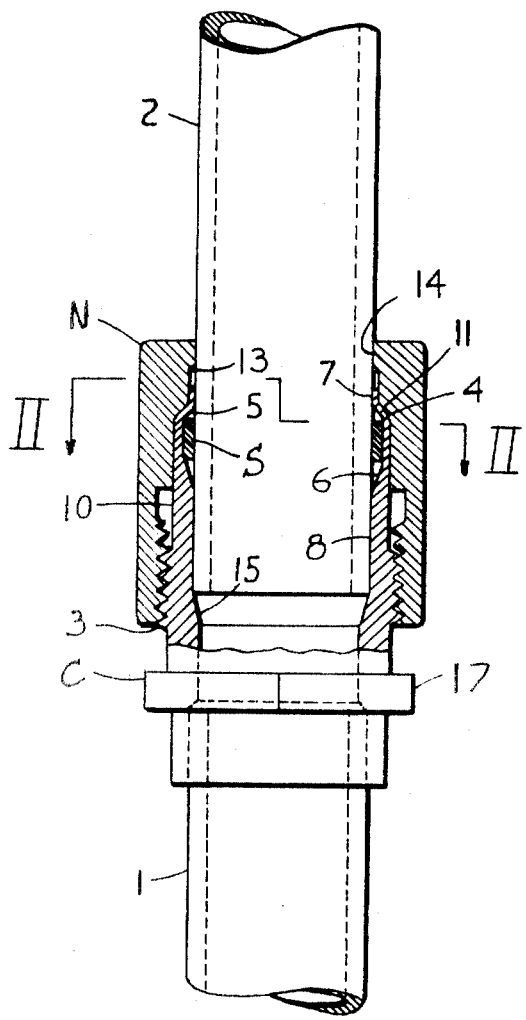
FIG.1
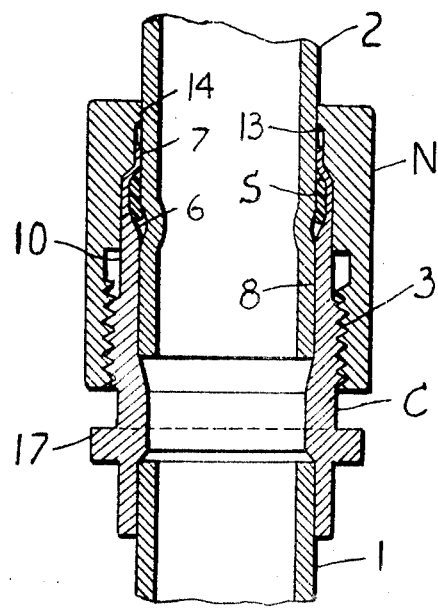
FIG.2
FIG.3
INVENTORS.
O O SHURTLEFF
LOUIS CHARLES SHURTLEFF
BY
Brown Critchlow, Flick & Peckham
ATTORNEYS

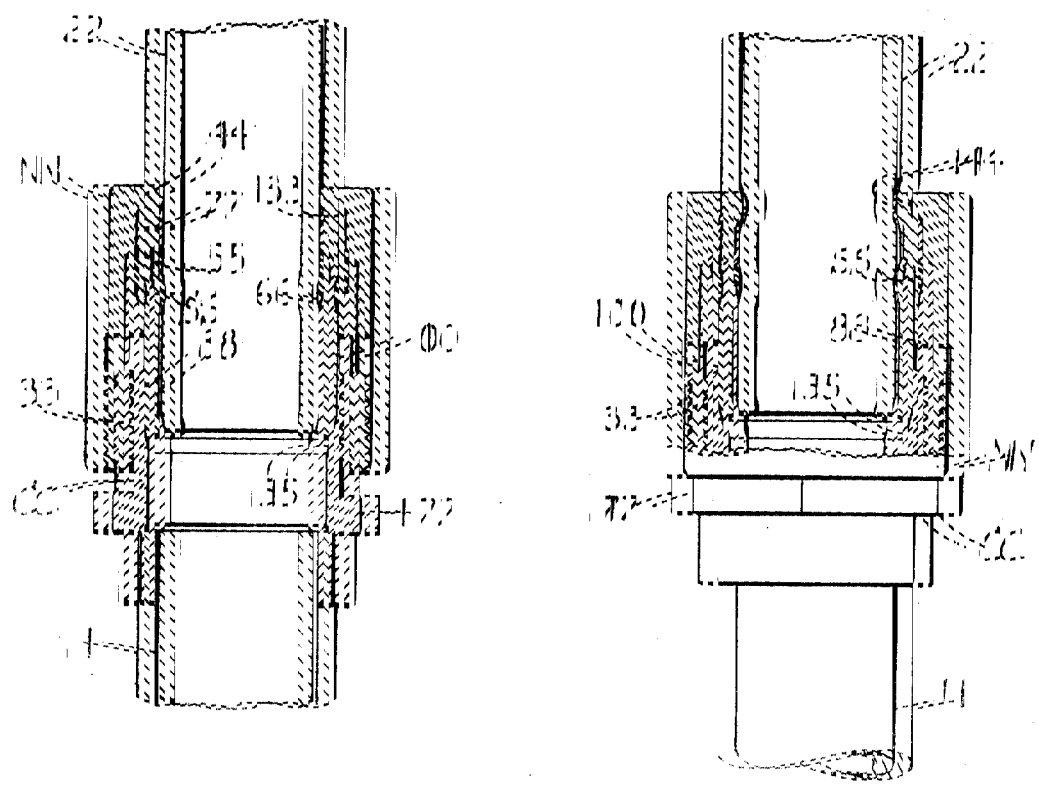

United States Patent Office 3,514,134
Patented May 26, 1970

3,514,134
CONDUIT FITTING WITH SEAL
O O Shurtleff and Louis Charles Shurtleff, Austin, Tex.,
assignors to Chatleff Controls, Inc., Austin, Tex., a corporation of Texas
Filed Nov. 6, 1968, Ser. No. 773,760
Int. Cl. F16l 17/00
U.S. Cl. 285—341                                                                        4 Claims

ABSTRACT OF THE DISCLOSURE

A tubular coupling is adapted to have its rear end secured to a pipe. The inside of the coupling at its front end has an annular recess with a cylindrical side surface and end surfaces tapered away from it. Near the back of the coupling its inside tapers rearwardly. A sealing ring in the recess is in contact with its side surface. The coupling has an outer cylindrical surface extending forward to a point beside the front end of the recess side surface, and the side wall of the recess and the portion of the coupling in front of it are thin and deformable. A nut for encircling a tube has a front end screwed part way onto the coupling and also has an inner surface engaging the coupling around its recess. The rear end of the nut has a portion spaced axially from the front end of the coupling. When the nut is tightened on the coupling, the nut deforms the thin part of the coupling to force the seal rearwardly and inwardly in the coupling.

---

There are conduit fittings not only for connecting two pipes or tubes together, but also for sealing the joint so that it will not leak. Such fittings generally are relatively complicated and expensive and often require the handling of several separate pieces, the loss of any one of which would render the fitting useless. Another shortcoming is that they generally grip the conduit at only one location so that any lateral movement of the conduit affects the seal.

It is among the objects of this invention to provide a fitting which will tightly engage a tube at two axially spaced locations, which will make a gas tight seal with the tube between those two locations, which includes a sealing member that firmly grips the tube, and which is not too complicated or expensive for low-cost usage.

The preferred embodiment of the invention is illustrated in the accompanying drawings, in which FIG. 1 is principally a longitudinal section through the fitting connected loosely to a conduit;

FIG. 2 is a cross section taken on the line II—II of FIG. 1;

FIG. 3 is a view similar to FIG. 1, but showing the fitting nut screwed further onto the coupling;

FIG. 4 is a similar view, but with the nut screwed still further onto the coupling; and FIG. 5 is a similar view but with the fitting in final position.

Referring to FIGS. 1 and 2 of the drawings, a conduit fitting is formed of three parts; namely, a coupling C, a nut N and a sealing ring S. These three parts are assembled together and secured to one end of a tube or pipe 1, which the fitting later connects to a tube 2 to complete the conduit. The coupling C has a rear end that fits around the end of pipe 1 and the two are soldered or brazed together. A short distance in front of its rear end the coupling is provided with an external screw thread 3. Near its front end the inside of the coupling is provided with an annular recess 4, which has a cylindrical side surface and end surfaces 5 and 6 that taper away from the side surface. The inner surfaces 7 and 8 of the coupling that lead away from the recess are cylindrical and have substantially the same diameter as the tube 2 inserted in the coupling.

The outer surface 10 of the coupling extending forward from approximately its thread to a point beside or opposite the front end of the cylindrical side surface of recess 4 is cylindrical. From there the outer surface of the coupling is tapered forward parallel to the tapered front end surface 5 of the recess and then extends straight ahead parallel to the front inner cylindrical surface 7 of the coupling. Consequently, the side wall of the recess and the portion of the coupling in front of it have a substantially uniform thickness. They are thin and deformable as compared with the wall thickness of the coupling behind the recess. The portion of the coupling in front of its screw thread originally is the same diameter throughout its length, but then the thin front end portion is deformed inwardly to provide a forwardly tapered shoulder 11 with a short cylindrical portion in front of it. This deforming of the coupling, which will be explained later, produces recess 4 in a very simple manner.

Fitting snugly in the coupling recess in contact with its side surface is the cylindrical sealing ring S, made of relatively hard but compressible material. The ring is of a softer character than the coupling and tube. The inner diameter of this ring is substantially the same as the inner diameter of cylindrical areas 7 and 8 of the coupling.

The nut N encircles the front end portion of the coupling and has a front end that is screwed part way onto its thread. The inner surface of the nut conforms to and engages the outer surface of the coupling around recess 4 and tapered shoulder 11 and the short length of coupling in front of the shoulder. The nut therefore has a tapered shoulder engaging the coupling shoulder. The inner surface of the nut also extends rearwardly in the nut in front of the coupling and then tapers inwardly slightly at 13 to a short cylindrical surface 14 that has substantially the same inner diameter as inner surfaces 7 and 8 of the coupling. In other words, when a tube 2 of the correct size is inserted in the fitting it will substantially engage the inside of the rear end portion of the nut, the inside of the coupling in front of and behind its recess, and the inside of the sealing ring. Surface 14 of the nut and surface 7 of the coupling form two axially aligned passages that prevent the tube from entering the fitting at enough of an angle for the end of the tube to damage the ring. The tube, thus aligned with the fitting, is pushed into it until stopped by a rearwardly tapered surface 15 at the back end of rear cylindrical surface 8 of the coupling. The fitting is now ready to be secured to the tube and sealed against it.

Although deforming of the front end of the coupling to the shape shown in FIG. 1 could be accomplished after tube 2 has been inserted, it is preferred to do it before the fitting is mounted in a conduit so that surfaces 7 and 14 will align the entering tube with the seal and so that there will be no danger of the seal falling out in case the nut is removed before the tube is inserted. Accordingly, the sealing ring first is inserted in the coupling, which it engages very tightly and then the nut is screwed onto the coupling. Since the front end portion at this time has not yet been contracted to form shoulder 11, the sloping area of the nut that later engages shoulder 11 will engage the very end of the coupling. A solid cylindrical mandrel that is as large as possible than is inserted in the fitting, and the nut is turned further onto the coupling to swage its front end portion inwardly toward the mandrel in conformity with the shape of the encircling portion of the nut. This produces a coupling having the shape shown in FIG. 1, and thereby forms recess 4 without the recess having to be cut in the wall of the coupling. The mandrel then is withdrawn and the fitting is ready to be attached to pipe 1, as it is in FIG. 1.

The connection of the fitting to tube 1 that has been inserted in it is accomplished simply by screwing the nut farther onto the coupling. As shown in FIG. 3, as the nut is screwed onto the coupling, the tapered shoulder in the nut will be forced against the adjoining coupling shoulder 11 and, by deforming or swaging the thin wall of the coupling, will progressively move the coupling shoulder, like a wave, backward relative to the rest of the coupling. The result is that the recess is shortened while the cylindrical front end of the coupling is lengthened. As the recess is shortened, the sealing ring in it is forced backward along the tapered rear end surface 6 of the recess, whereby the rear end portion of the ring is compressed radially inward into extremely tight engagement with tube 2. If the wall of tube 2 is thin enough to be deformed by the pressure of the ring, the contracted rear end of the ring will bend the tube well inwardly slightly as shown.

As the nut continues to be screwed farther onto the coupling, as shown in FIG. 4, the sealing ring is forced even more tightly against the tube and grips it so firmly that it actually pushes the tube farther into the coupling. In doing this, the front end of the tube is jammed tightly against the tapered surface 15 of the coupling, and even may be bent inwardly slightly by it. The distance that the tube is moved axially in this manner is very slight, but it is sufficient to press the front end of the tube very tightly against the inner surface of the coupling.

The nut continues to be screwed onto the coupling until the front end of the nut abuts against an integral shoulder 17 encircling the rear end of the coupling, as shown in FIG. 5. The shoulder locks the nut in place so that it will not be loosened by vibration. By this time, the small tapered shoulder 13 at the rear end of the nut will have contracted the front end of the coupling, which in turn will have tightly engaged the tube wall and possibly even bent it inwardly slightly at that point. The result is that the extreme end of the tube and the portion of the tube within the rear end of the nut are very tightly engaged by encircling axially spaced portions of the coupling. Also, an area of the tube between its two gripped areas is very tightly gripped by the deformed sealing ring, which likewise tightly engages the encircling coupling so that there can be no leakage between them. It will be seen that flexing the portion of tube 2 outside of the fitting will not have any effect on the gas tight seal, because the tube is so firmly gripped in front of and behind the seal.

With the fitting disclosed herein, the sealing ring is moved along a tapered surface in such a manner as to mechanically grip the tube and force it forward into another taper so that the coupling will grip the end of the tube. In fact, the fitting grips the tube at opposite ends of the sealing ring. Yet, the fitting is not excessively complicated or expensive. There is no tendency for the nut to twist the tube as the nut is tightened because the nut itself does not tightly engage the tube.

We claim:

1. A conduit fitting for connecting a pipe with a tube, comprising a tubular coupling having a rear end adapted to be secured to a pipe and having an external screw thread adjacent that end, the inside of the coupling being provided near its front end with an annular recess having a cylindrical side surface and front and rear end surfaces tapering away from the side surface, the inner surfaces of the coupling that lead away from the recess being cylindrical front and rear surfaces that have substantially the same diameter, the inside of the coupling tapering rearwardly from the back end of its rear cylindrical surface, a sealing ring in said recess in contact with its side surface and having an inner diameter substantially the same as said first-mentioned diameter, the coupling having a cylindrical outer surface extending forward from near said thread to a point beside the front end of said recess side surface, the side wall of the recess and the portion of the coupling in front of it having a substantially uniform thickness and being thin and deformable, whereby the front end wall of the recess forms a forwardly tapered shoulder, and a nut having a front end screwed part way onto said thread and having an inner surface conforming to and engaging said cylindrical outer surface of the coupling around said recess and behind the recess, said inner surface of the nut also conforming to and engaging the outer surfaces of said shoulder and the portion of the coupling in front of the shoulder, whereby when the nut is tightened on the coupling the sealing ring will be pushed rearwardly and inwardly along said tapered rear end surface of the recess, and the rear end of the nut having a portion spaced axially from the front end of the coupling with an inner diameter substantially the same as said first-mentioned diameter for fitting around a tube that will fit in the coupling and sealing ring.

2. A conduit fitting according to claim 1, in which said inner surface of the nut beyond the coupling is connected with said rear end portion of the nut by a rearwardly tapered surface that will engage and bend inwardly the front end of the coupling when the nut is tightened on the coupling.

3. A conduit fitting according to claim 1, in which all of the wall of the coupling behind said thin side wall of the recess is thicker than said side wall and is rigid.

4. A conduit fitting according to claim 1, in which said cylindrical outer surface of the coupling extends to the front end of the coupling before the nut is applied.

References Cited

UNITED STATES PATENTS

| | | | |
|---|---|---|---|
| 3,079,182 | 2/1963 | Appleton | 285—343 |
| 3,425,452 | 2/1969 | Shaw | 285—343 X |

DAVID J. WILLIAMOWSKY, Primary Examiner

W. L. SHEDD, Assistant Examiner

U.S. Cl. X.R.

285—382